United States Patent [19]

Leary

[11] Patent Number: 5,570,238
[45] Date of Patent: Oct. 29, 1996

[54] THERMALLY COMPENSATING LENS MOUNT

[75] Inventor: David F. Leary, Woodside, Calif.

[73] Assignee: Lockheed Missiles & Space Company, Inc., Sunnyvale, Calif.

[21] Appl. No.: 414,629

[22] Filed: Mar. 31, 1995

[51] Int. Cl.$^6$ .................................................. G02B 7/02
[52] U.S. Cl. ................................. 359/820; 359/819
[58] Field of Search ................................ 359/820, 819

[56] References Cited

U.S. PATENT DOCUMENTS

| | | | |
|---|---|---|---|
| 4,236,790 | 12/1980 | Smith | 359/820 |
| 5,210,650 | 5/1993 | O'Brien et al. | 359/820 |
| 5,283,695 | 2/1994 | Ziph-Schatzberg et al. | 359/820 |
| 5,313,333 | 5/1994 | O'Brien et al. | 359/820 |

FOREIGN PATENT DOCUMENTS

| | | | |
|---|---|---|---|
| 2830341 | 1/1979 | Germany | 359/820 |
| 0172604 | 10/1983 | Japan | 359/820 |
| 1486797 | 6/1989 | U.S.S.R. | 359/820 |

*Primary Examiner*—Loha Ben
*Attorney, Agent, or Firm*—Leo V. Novakoski; Edward J. Radlo

[57] ABSTRACT

A thermally compensating lens mount (40) comprises an axially symmetric housing (42) that is formed from an inner layer of a first material (44) having a low coefficient of thermal expansion (CTE) to an outer layer of a second material (46) having a high CTE. The longitudinal cross-section of the housing (42) has a barrel shaped geometry along the symmetry axis (47) so that differential thermal expansion of the first and second materials (44, 46) decreases the length of the housing (42) along its axis of symmetry (47) by an amount determined by the CTEs of the inner and outer layers (44, 46), their thicknesses, and the geometry of the barrel shape.

18 Claims, 9 Drawing Sheets

FIG_1
PRIOR ART
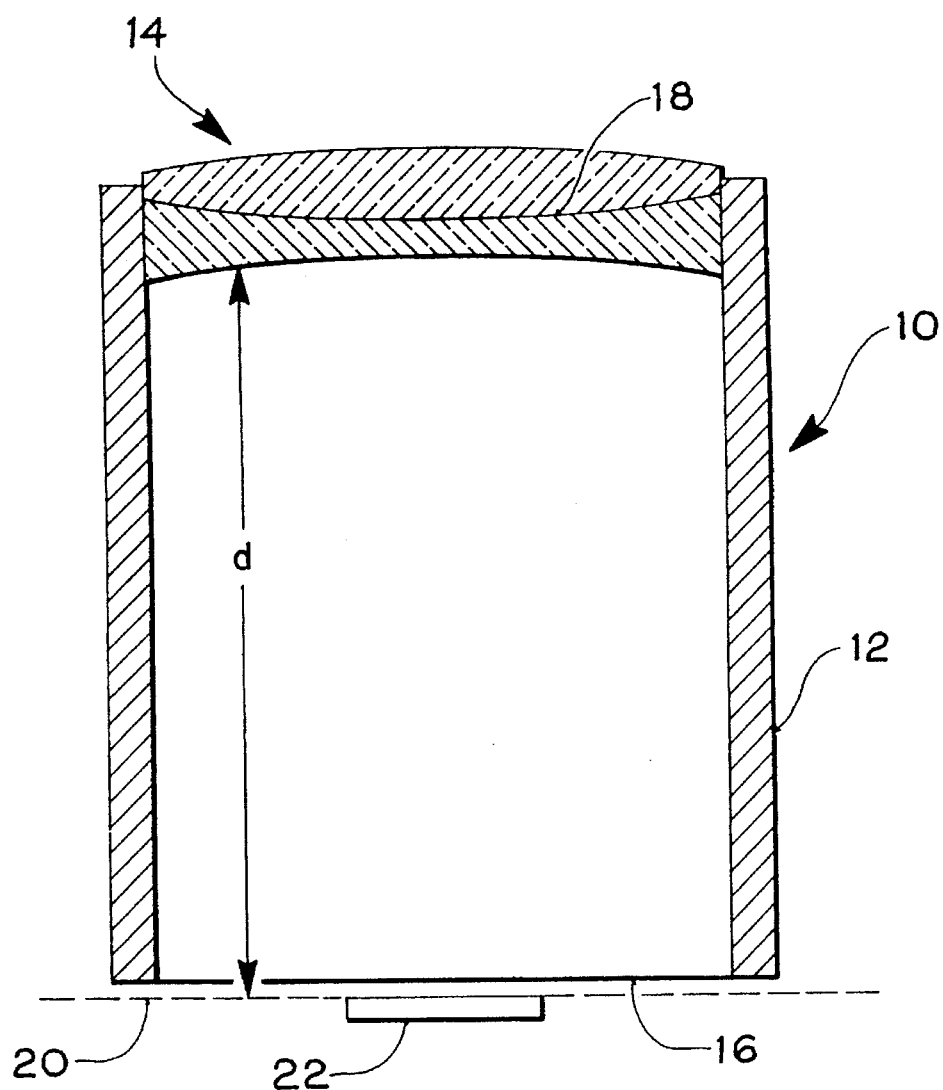

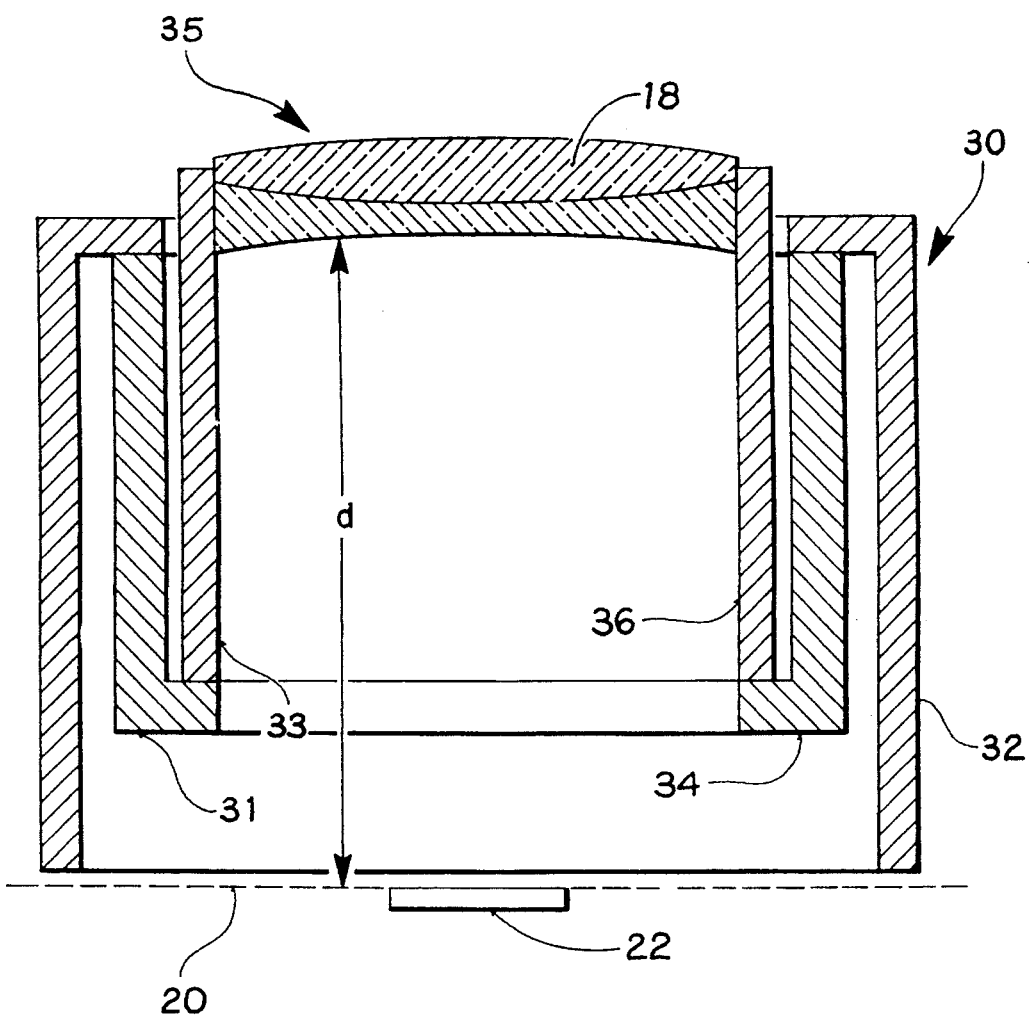
FIG_2
PRIOR ART

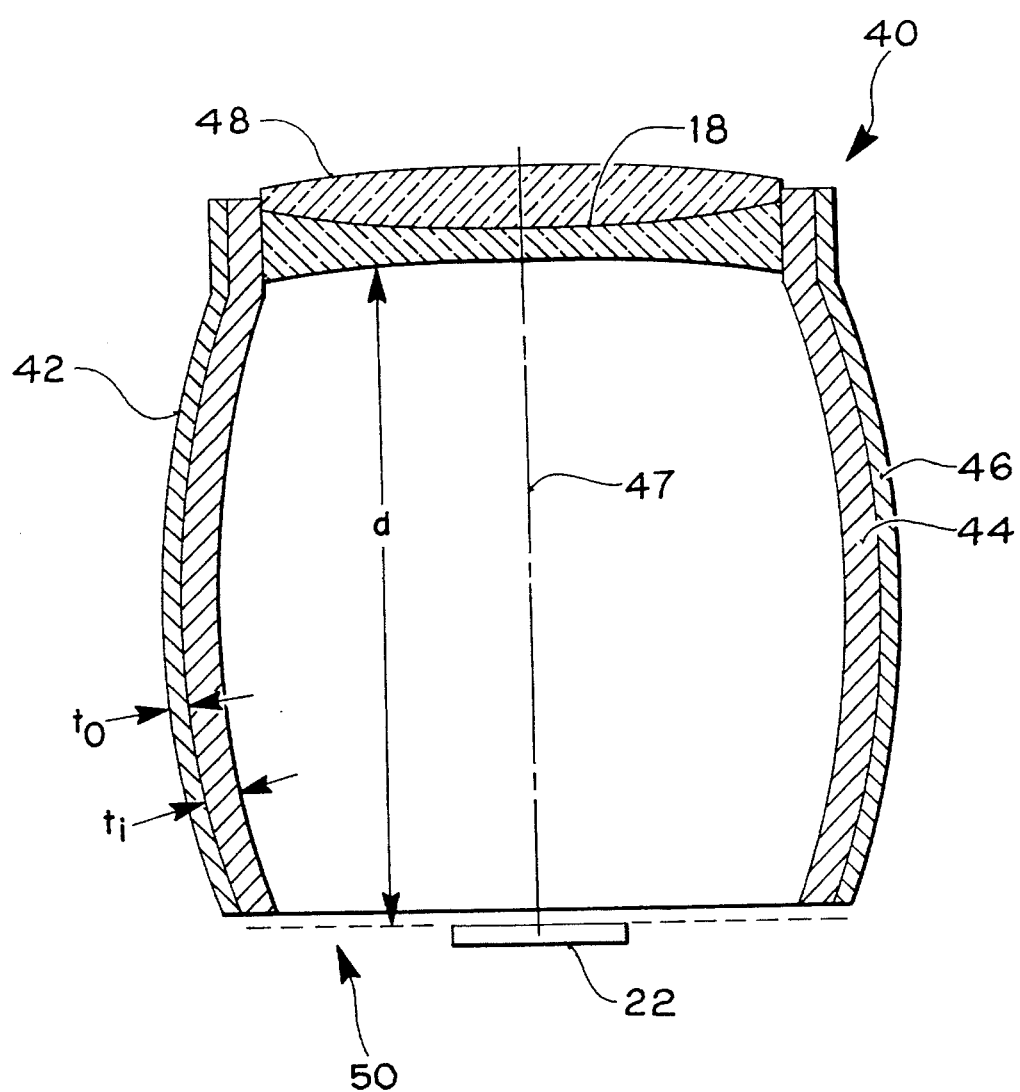
FIG_3A

FIG_3B
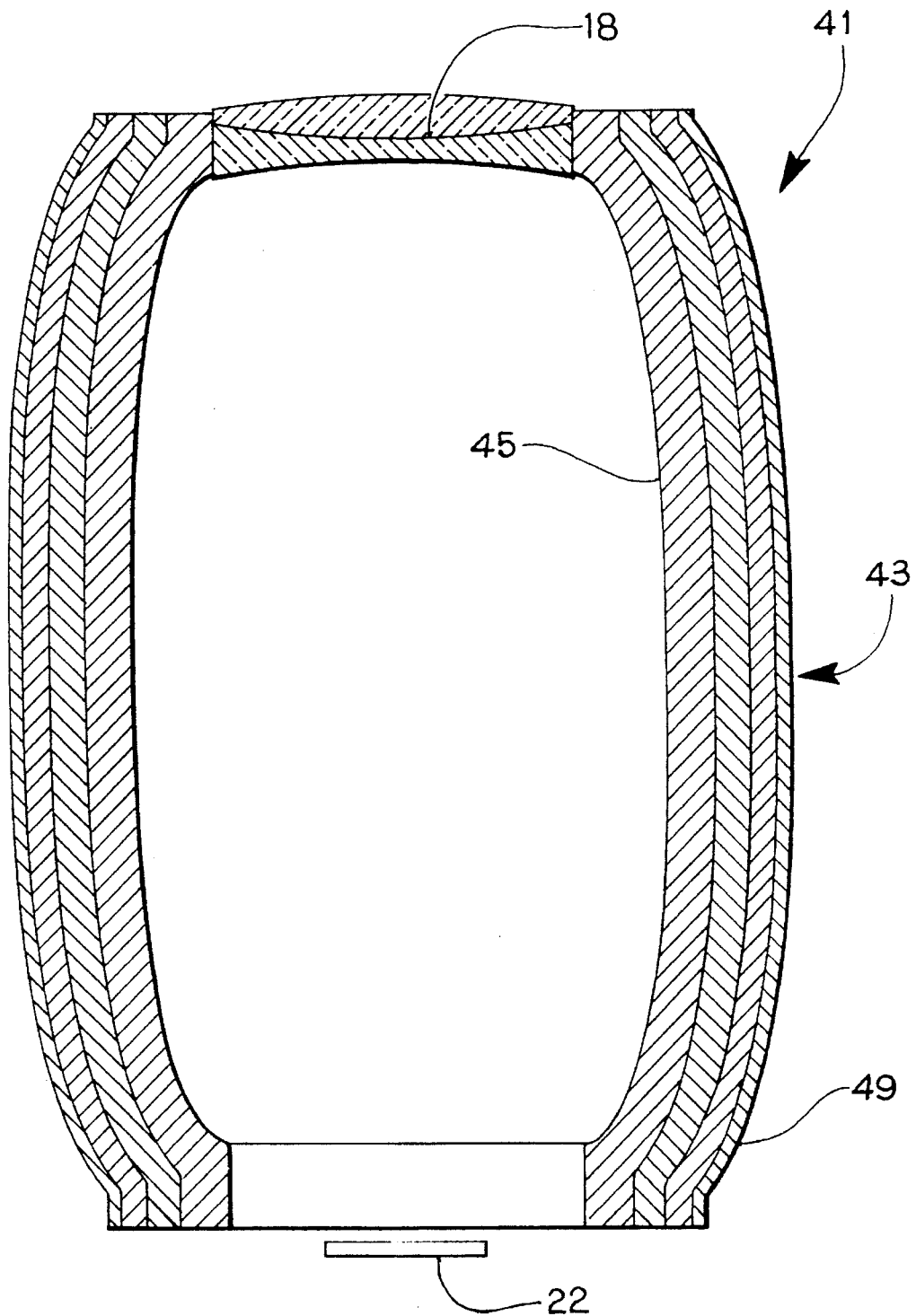

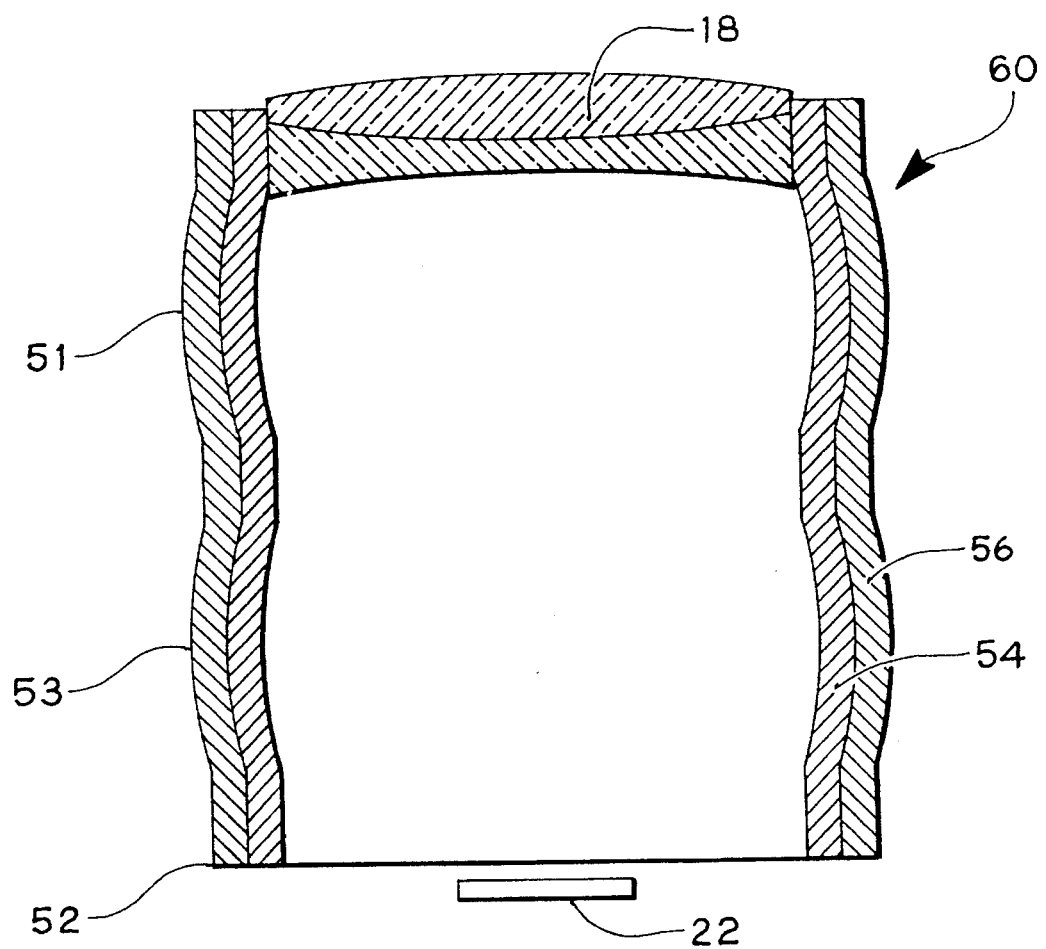
FIG_4

FIG_5A
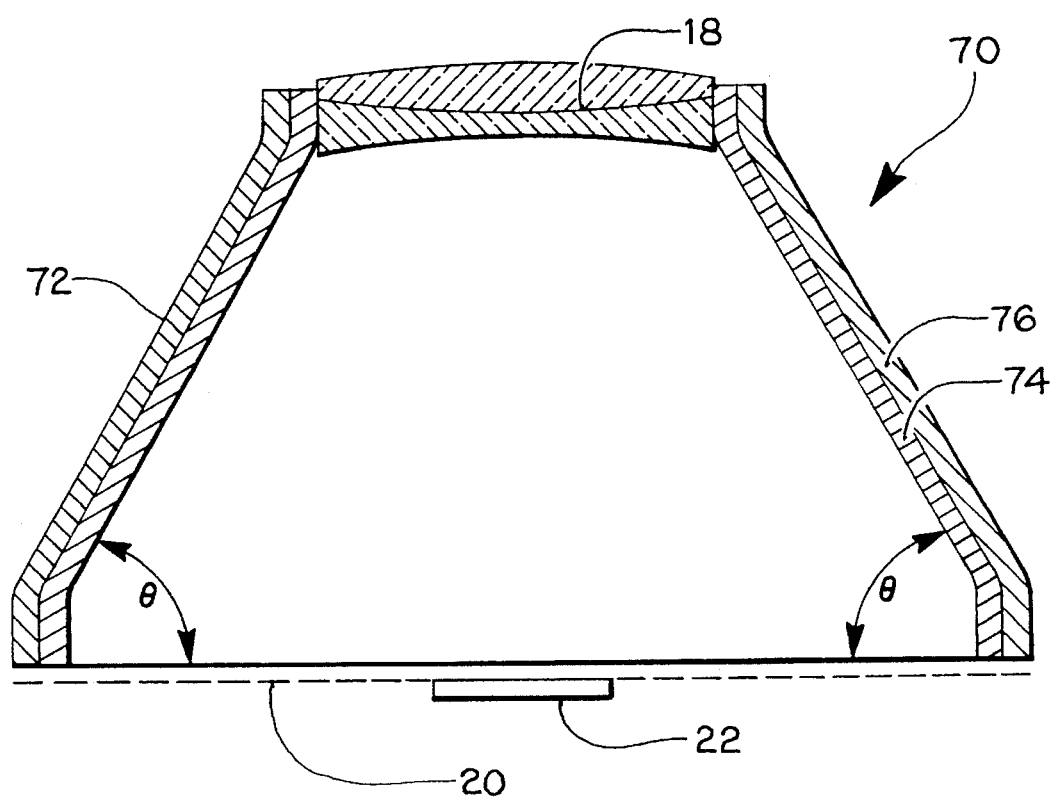

FIG_5B
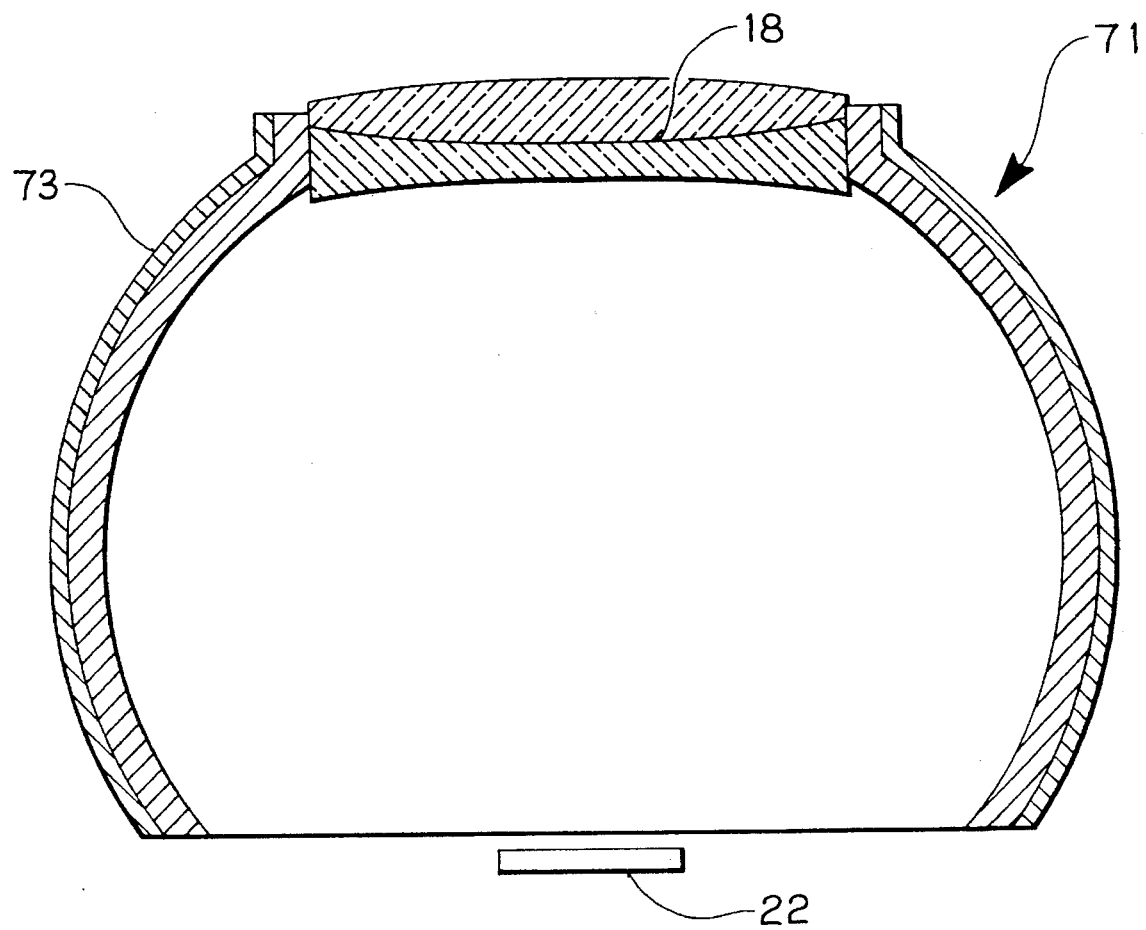

FIG_6
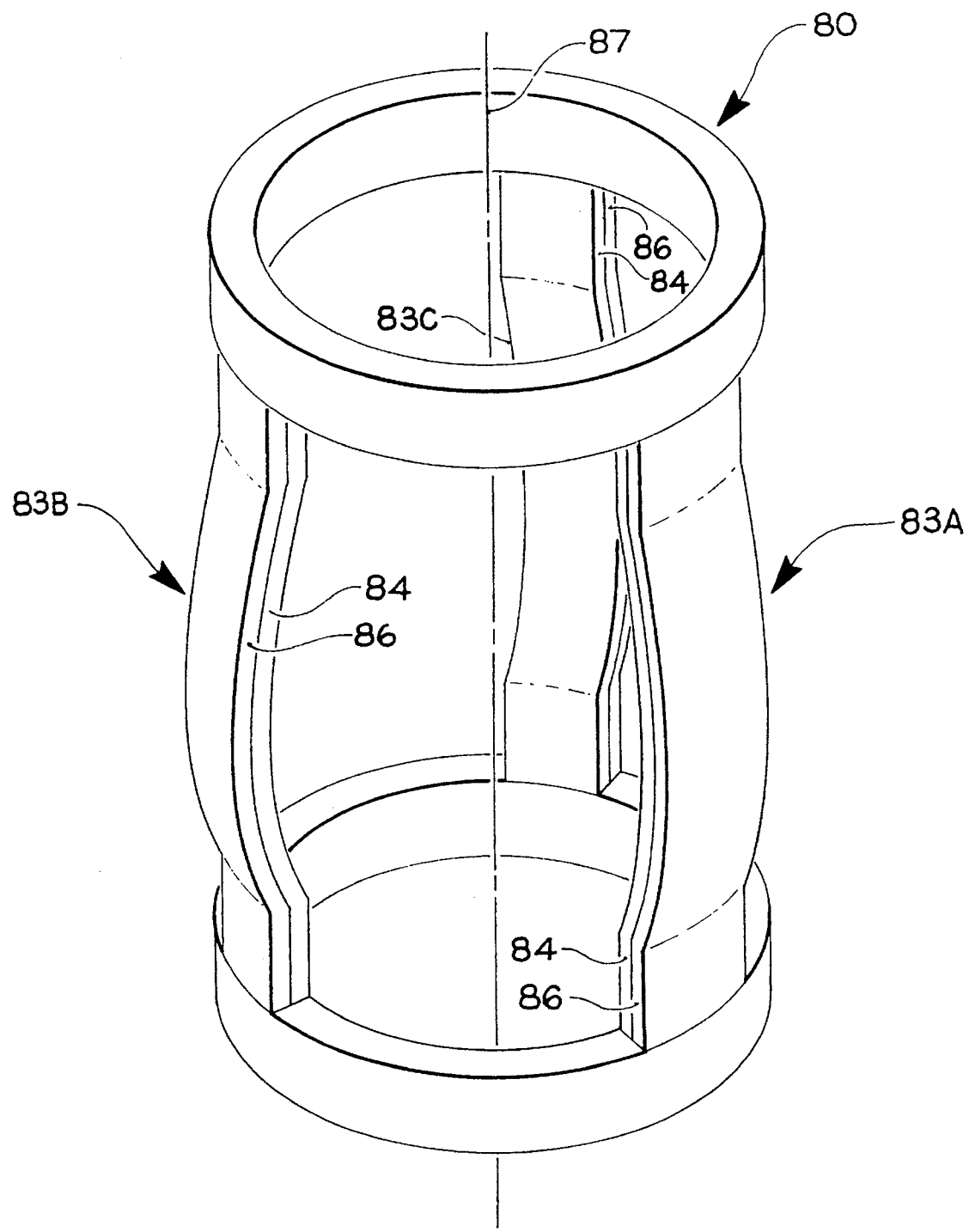

FIG_7
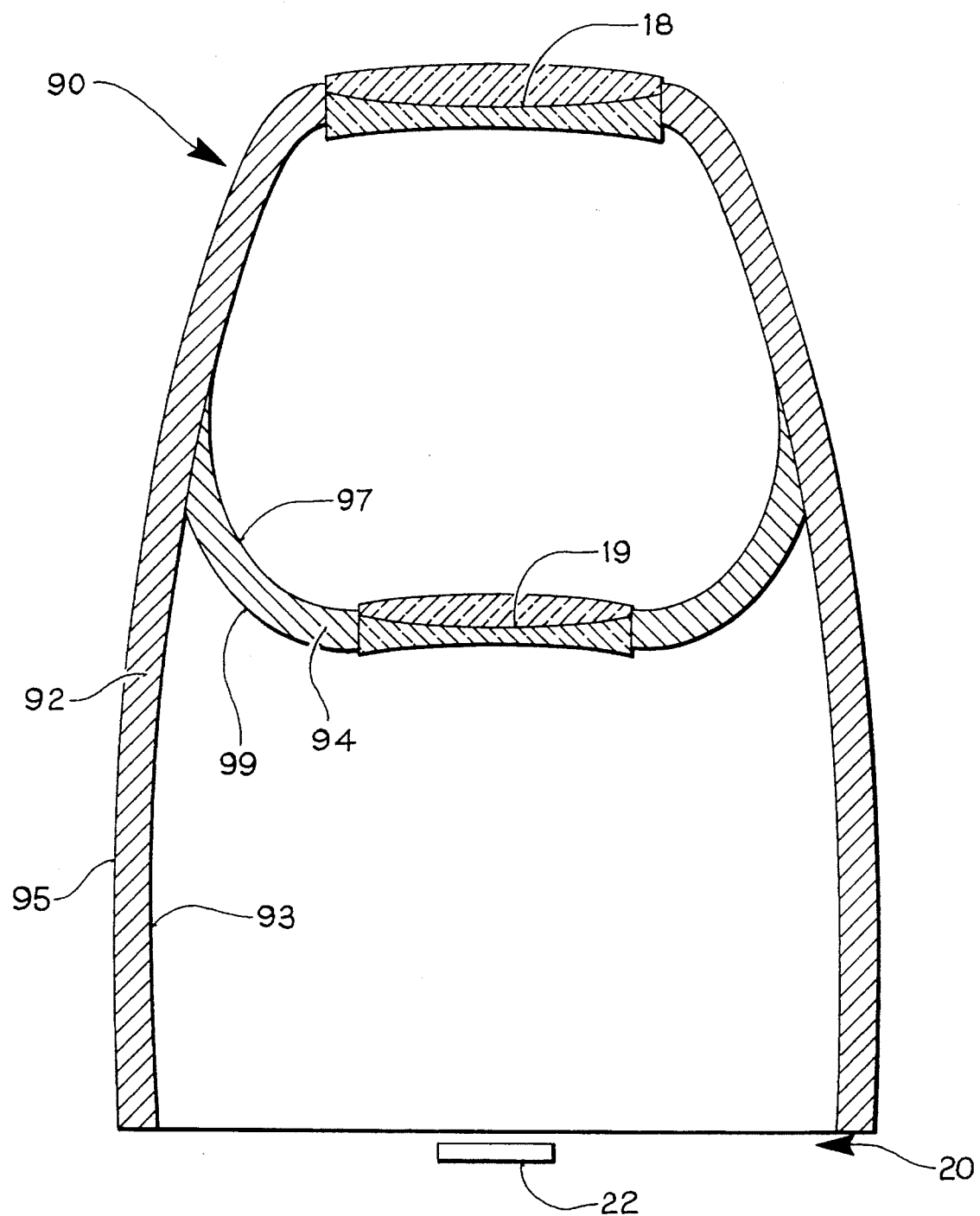

5,570,238

THERMALLY COMPENSATING LENS MOUNT

BACKGROUND OF THE INVENTION

1. Field of the Invention

The present invention relates to the field of optical systems, and more particularly, to the field of lens mounts which compensate for changes in the properties of optical systems as the temperature of the system changes.

2. Background Art

It is frequently desirable to have a lens mounted so that the image it transmits can be focused on a detector over a wide range of temperatures. However, the indices of refraction of all lens materials exhibit some variation with temperature, and as a result, the focusing properties of an optical system including the lens are altered. Lens designs and manufacturing processes have been developed to minimize this effect, but for many applications the residual temperature dependence is sufficient to pose problems.

Changes in the focal length of a lens are of little consequence where the lens is part of an optical system that focuses visible light. In these cases, for example, with a pair of binoculars, a user monitors the image and adjusts the optical system to compensate for any changes in focal length of the lens with temperature. The situation is very different where the lens focuses an image onto a focal plane array or detector, which subsequently processes the focused light rays. Such arrangements are common, for example, in military applications involving radiation in the infrared (IR) wavelength region. In this situation, no human user can monitor and readjust the focus of the optical system in response to thermally induced changes in the index of refraction of the lens material. Consequently, it is desirable that these optical systems include some built-in means to compensate for thermally induced changes in the optical system.

In many types of lenses, particularly those used for IR radiation, the index of refraction of the lens material changes in a manner that decreases the focal length of the lens as the temperature increases. On the other hand, lens mounts commonly used to support a lens above its focal plane are constructed of materials having positive coefficients of thermal expansion (CTE). The expansion of these material with rising temperatures thus increases the distance between the lens and the focal plane. This change reinforces the defocusing effects attributable to the decrease in the focal length of the lens with increasing temperature.

Previous attempts to deal with this problem have employed a reentrant tube geometry for the lens mount. Reentrant tube lens mounts comprise three precision-machined mounting tubes having different thermal properties. The mounting tubes are arranged in a coaxial geometry and connected so that the net CTE of the three tube structure moves the lens in the desired direction as the temperature varies. This mechanically complex structure makes it difficult to construct reentrant tube lens mounts that are sufficiently rugged to withstand use in high vibration environments such as ground vehicles or aircraft, especially rotary wing air craft. Further, it is sometimes necessary to provide a special atmosphere such as dry air or nitrogen within the lens mount structure. The complex structure of reentrant tube lens mounts makes it difficult to establish and maintain the seals necessary to preserve the special atmosphere. In addition, it is difficult to find materials that have sufficiently high CTEs for the degree of compensating motion that may be necessary. In some cases, plastic materials are used for the intermediate tube. However, little is known about the long-term repeatability of the CTE behavior of these materials. For these reasons, there is a need for a thermally compensated lens mount that requires neither complex geometries nor unusual or untested material.

SUMMARY OF THE INVENTION

The present invention is a lens mount that provides thermal compensation without using complex geometries or unusual materials. Instead, lens mounts in accordance with the present invention employ an axially symmetric housing having a multilayer structure and a longitudinal geometry that function cooperatively to convert the differential expansion of the multilayers into the desired lengthening or shortening of the lens mount along the axis of symmetry. Thus, the net CTE of the lens mount reflects the combined effects of its multilayer structure and longitudinal geometry.

A thermally compensated lens mount (40) in accordance with the present invention includes an axially symmetric housing (42) comprising an outer layer of material (46) having a first CTE and an inner layer of material (44) having a second CTE. The inner and outer layer materials (44, 46) are chosen so that their CTEs produce a differential expansion of the housing (42) as the temperature of the lens mount (40) increases, and the geometry of the housing (42) along its axis of symmetry (47) is selected to convert the differential expansion into net expansion or contraction of the lens housing (42) along the axis of symmetry (47), as desired. For example, the length of a lens mount (40) in which the axially symmetric housing (42) has a convex, arcuate shape along the axis of symmetry (47) (longitudinal cross-section) may be made to decrease with increasing temperature when the CTE of the outer layer material (46) is greater than that of the inner layer material (44).

The actual magnitude of the net CTE for the lens mount (40) will depend on the CTEs of the materials selected to form the outer and inner layers (46, 44) of the housing, the thicknesses of these layers, and the geometry of the housing along its axis of symmetry (47.). In addition, fine adjustments to the net CTE can be made after the lens mount (40) has been formed by altering the thickness of either layer with chemical or mechanical means.

The present invention also encompasses lens mounts (41) in which the composition of the housing is graded between the inner and outer surfaces (45, 49) of the housing (43) to provide compositions having different CTEs at the inner and outer surfaces (45, 49) of the housing.

Lens mounts in accordance with the present invention include axially symmetric housings having convex, arcuate geometries with circular, barrel shaped, or conical longitudinal cross-sections. In addition, the axially symmetric housing may be formed in which the longitudinal cross-section comprises a series of circular or barrel-shaped sections arranged along the axis of symmetry. Further, light weight lens mounts may be produced by employing axially symmetric housings having open geometries comprising three or more housing sections each of which has the desired geometry along the axis of symmetry.

BRIEF DESCRIPTION OF THE DRAWINGS

FIG. 1 is a conventional lens mount without any thermal compensation.

FIG. 2 is a conventional lens mount in which a reentrant tube geometry provides thermal compensation.

FIGS. 3A and 3B are lens mounts in accordance with the present invention, having housings with convex, arcuate shaped cross-sections along their axes of symmetry.

FIG. 4 is a lens mount in accordance with the present invention in which the cross-section of the housing includes a series of arcuate, convex shaped cross-sections along the axis of symmetry.

FIGS. 5A and 5B are lens mounts in accordance with the present invention in which the housings have conical geometries along their axes of symmetry.

FIG. 6 is a lens mount in accordance with the present invention in which the housing has an open geometry comprising three sections, each of which has an arcuate, convex cross-section along the axis of symmetry.

FIG. 7 is a lens mount in accordance with the present invention in which the housing accommodates multiple lens elements at different distances from the focal plane.

DETAILED DESCRIPTION OF THE PREFERRED EMBODIMENTS

Referring to FIG. 1, there is shown a conventional lens mount 10 comprising a lens mounting tube 12 that forms a lens opening 14 and a focal plane opening 16 at opposite ends of mounting tube 12. Lens opening 14 accommodates a lens 18 or an additional structure (not shown) to which a lens 18 is attached. Focal plane opening 16 is positioned over a detector 22 located in focal plane 20 of lens 18. Although lens 18 is shown as a compound lens in all figures, the properties of the present invention do not depend on the type of lens used.

Typically, lens mounting tube 12 is made of a metallic material so that any increase in temperature increases the distance, d, between lens 18 and focal plane 20. Where the focal length of lens 18 decreases with increasing temperatures, as is usually the case with most lens materials, the defocusing effect due to the temperature dependence of the focal length is exacerbated by the concomitant elongation of lens mounting tube 12.

Referring now to FIG. 2, there is shown a reentrant tube lens mount 30 designed specifically to address the defocusing problem discussed above. Reentrant robe lens mount 30 comprises a coaxial configuration of an outer tube 32, an intermediate tube 34, and a inner tube 36. Outer tube 32 is made of a material having a low CTE and is anchored to a structure (not shown) near focal plane 20. Intermediate tube 34 is made of a high CTE material and attaches to outer tube 32 at an end 31 distal from focal plane 20. Inner tube 36 is made of a low CTE material, and is attached to intermediate tube 34 at an end 33 proximate to focal plane 20. Lens 18 is seated at a lens opening 35 of inner tube 36 distal from focal plane 20. The relatively high CTE of intermediate tube 34 and the geometry of its attachment to outer tube 32 allows the distance, d, between lens 18 and focal plane 20 to decrease as the temperature of reentrant tube lens mount 30 increases.

In order to accurately compensate for temperature variations, tubes 32, 34, 36 of reentrant tube lens mount 30 must be precisely machined and connected in a relatively complex geometry. In addition, the CTEs of tubes 32, 34, 36 must be carefully selected to provide the proper compensation. The requirements of multiple connection points, precision parts, and material properties make reentrant tube lens mounts 30 poorly suited for applications in rugged, high vibration environments.

Referring now to FIG. 3A, there is shown one embodiment of a lens mount 40 in accordance with the present invention. Lens mount 40 comprises an axially symmetric housing 42 formed by bonding an outer layer 46 of a first material to an inner layer 44 of a second material. The materials of outer layer 46 and inner layer 44 are selected so that their CTEs provide a differential expansion which couples with the longitudinal geometry of housing 42 to alter the length of lens mount 40 as discussed below.

Axially symmetric housing 42 has a lens opening 48 and a focal plane opening 50 substantially parallel to lens opening 48 with both openings 48, 50 perpendicular to axis of symmetry 47. A lens 18 is shown mounted at lens opening 48 although this geometry is not essential. For example, additional lens mounts 40 may be connected between lens opening 48 and lens 18 to provide greater thermal compensation. Alternatively, other optical elements could be mounted between lens 18 and lens opening 48.

The geometry of housing 42 provides the means by which the differential expansion of inner and outer layers 44, 46 is harnessed to alter the length of lens mount 40 in the desired direction. In effect, the interaction between longitudinal geometry of housing 42 and the different CTEs of outer and inner layers 46, 44 generate a net CTE for lens mount 40 having the desired sign and magnitude. The longitudinal geometry of housing 42 is selected so that a longitudinal cross-section of housing 42 through axis of symmetry 47 has a convex, arcuate shape at a reference temperature (typically, room temperature). As shown in FIG. 3A, housing 42 of lens mount 40 has a barrel shaped longitudinal cross-section, giving axially symmetric housing 42 a barrel-like geometry.

With the longitudinal geometry for axially symmetric housing 42 shown in FIG. 3A and the CTE of outer layer 46 selected to be larger than that of inner layer 44, an increase in the temperature of lens mount 40 leads to differential elongation of inner and outer layers 44, 46, respectively, with outer layer 46 elongating more than inner layer 44. This differential expansion coupled with the convex, arcuate geometry of housing 42, causes the radius of curvature, R, of housing 42 to decrease and moves lens opening 48 closer to focal plane opening 50 along symmetry axis 47. When the temperature of lens mount 40 is decreased, differential contraction of inner and outer layers 44, 46, causes the radius of curvature, R, of housing 42 to increase, increasing distance, d, between lens opening 48 and focal plane opening 50. Materials having suitably low CTEs include iron and steel, while materials having suitably high CTEs include zinc.

It is noted that a housing 42 having a concave arcuate longitudinal geometry would provide comparable shortening of d with increasing temperature. However, such a geometry is less desirable since the inward movement of the concave arcuate section of housing 42 as lens mount 40 shortens may impinge on the light path between lens 18 and detector 22. Similar considerations apply to the other axially symmetric multilayer housings discussed below.

The magnitude of the change in d with increasing and decreasing temperatures depends on the CTEs and thicknesses, $t_i$, $t_o$, of inner and outer layers 44, 46, respectively, and the geometry of housing 42. Accordingly, these parameters can be selected to provide the net CTE for lens mount 40 necessary to offset changes in the focal length of lens 18 with temperature. Even after lens mount 40 has been assembled, the net CTE can still be adjusted by, for example, chemically etching or machining away a portion of inner or outer layer 44, 46.

Referring now to FIG. 3B, there is shown a lens mount 41 comprising a housing 43 the composition of which varies from inner surface 45 to outer surface 47, creating a corresponding gradation in the CTE of housing 42 between inner surface 45 and outer surface 49. The resulting composition gradient is indicated by the increasing density of lines moving from inner surface 45 to outer surface 49. By adjusting the composition of housing 43 so that the CTE increases from inner surface 45 to outer surface 49, lens mount 41 will undergo the same contraction with increasing temperature as described for lens mount 40. In effect, the bilayer structure of lens mount 40 has been replaced with a multilayer structure in the limit that each layer is substantially thinner than thickness, t, of housing 43.

Referring now to FIG. 4, there is shown another embodiment of lens mount 60 in which axially symmetric housing 52 comprises first and second sections 51, 53, each of which has a convex, arcuate longitudinal geometry. The use of first and second sections 51, 53 provides for greater changes in d with variations in the temperature of lens mount 60. As with lens mount 40 of FIG. 3A, axially symmetric housing 52 of lens mount 60 comprises an inner layer 54 of material and an outer layer 56 of material, with the CTEs and thicknesses of inner and outer layers 54, 56 selected to achieve a net CTE for axially symmetric housing 52 that produces a desired temperature dependence for d.

Referring now to FIG. 5A, there is shown still another lens mount 70 in accordance with the present invention. Lens mount 70 comprises an axially symmetric housing 72 having a conical geometry so that a longitudinal cross section has a trapezoidal shape, i.e. a circular shape with infinite radius of curvature. As with housings 42, 52 housing 72 is formed from an inner layer 74 of a first material and an outer layer 76 of a second material. By choosing the second material to have a larger CTE than the first material, the (infinite) radius of curvature of housing 72 decreases with increasing temperature due to the differential expansion of inner and outer layers 74, 76, respectively. By further selecting the thicknesses of inner layer 74 and outer layer 76 and base angle, Θ, appropriately, the net CTE of lens mount 70 can be adjusted so that the length of axially symmetric housing 72 decreases with temperature at the desired rate.

Referring now to FIG. 5B, there is shown a lens mount 71 which is a modification of lens mount 70 in housing 73 is substantially conical but with an arcuate, longitudinal cross section.

Each of lens mounts 40, 41, 60, 70, 71 is shown having a continuous housing 42, 43, 52, 72, 73, respectively. Such continuous housings are suitable for maintaining special atmospheres within the lens mount since the lens mount need only be sealed to lens 18 and to a surface in focal plane 20. Thus, lens mounts in accordance with the present invention have only two sealing surfaces, rather than the four sealing surfaces of reentrant tube lens mount 30.

There may be applications in which a light bilayer weight lens mount is desirable. One way to reduce weight is to reduce the amount of materials present in lens mounts 40, 41, 60, for example, by forming the axially symmetric housing with an open structure.

Referring now to FIG. 6, there is shown a perspective view of a lens mount 80 in which an axially symmetric housing 82 comprises three sections 83a, 83b, 83c that are equally spaced around symmetry axis 87 of housing 82. Each section 83a, 83b, 83c is formed by bonding an inner layer 84 of a first material to an outer layer 86 of a second material. Equally spaced sections 83a, 83b, 83c provide axial symmetry to bilayer housing 82 so that expansion and contraction do not shift lens 18 off of symmetry axis 87. The geometry of housing 82 is selected so that a longitudinal cross-section of each section 83a, 83b, 83c has a convex arcuate shape. As in the case of lens mounts 40, 60, 70 having continuous housings 42, 52, 72, respectively, the magnitude and sign of the net CTE of lens mount 80 is adjusted through the longitudinal geometry of housing 82, and the thicknesses and CTEs of inner and outer layers 84, 86.

Referring now to FIG. 7, there is shown a lens mount 90 in accordance with the present invention suitable for positioning multiple lenses 18, 19 with respect to focal plane 20. Lens mount 90 comprises first and second housing sections 92, 94, respectively, where each housing section 92, 94 has an axis of symmetry and arcuate, longitudinal cross section as discussed above. Inner and outer surfaces 93, 95 of first housing section 92 are provided with different CTEs by forming first housing section 92 with a multilayer structure or a compositional gradient as described above. In a similar manner, second housing section 94 is provided with inner and outer surfaces 97, 99 having different CTEs. The compositions and dimensions of first and second housing sections 92, 94 may be selected independently to accommodate the different thermal behaviors of lenses 18, 19, respectively, so that both lenses 18, 19 may be compensated simultaneously for thermal changes by expansions and contractions of housing sections 92, 94.

The present invention may also accommodate complex lens combinations in which three or more lens elements in an optical path must be independently compensated for temperature effects. In these cases, the optimal position of each lens element relative to the elements preceding and following it in the optical path can be maintained by selecting the geometry and materials of the housing that supports the lens element to expand and contract in a manner that offsets changes in the focal point of the lens element with temperature.

It is noted that any of lens mounts 40, 41, 60, 70, 71, 80, 90 may include layers in addition to those described, such as antireflection or anticorrosion coatings. In addition, any of lens mounts 40, 60, 70, 71, 80, 90 may be realized with housings 42, 62, 72, 73, 82, 92 having composition gradients and corresponding CTE gradients instead of discrete layers to provide the differential contraction and expansion described in conjunction with FIG. 3B.

There has thus been presented a thermally compensating lens mount capable of providing a range of net CTEs of either sign using an axially symmetric housing having a multilayer structure and selected longitudinal geometry. The differential expansion of the inner and outer surfaces of the housing combines with the housing geometry to create the desired net CTE.

What is claimed is:

1. A thermally compensated lens mount comprising a multilayer housing formed by a layer of a first material having a first coefficient of thermal expansion (CTE) affixed to a layer of a second material having a second CTE, the multilayer housing having a symmetry axis and a selected curvature along the symmetry axis such that differential thermal expansion of the first and second materials changes the curvature, altering the length of the multilayer housing along its symmetry axis.

2. The thermally compensated lens mount of claim 1, wherein the selected curvature is convex.

3. The thermally compensated lens mount of claim 2, wherein the selected curvature is constant, giving the housing a circular shaped longitudinal cross-section.

4. The thermally compensated lens mount of claim 1, wherein the selected curvature varies along the symmetry axis to give the housing a barrel shaped longitudinal cross-section.

5. The thermally compensated lens mount of claim 1, wherein the selected curvature is zero and the housing has a longitudinal cross-section that is a trapezoidal shape.

6. The thermally compensated lens mount of claim 1, wherein the multilayer housing comprises at least three substantially identical sections equally spaced around the symmetry axis of the multilayer housing, each section having a substantially identical selected curvature.

7. The thermally compensated lens mount of claim 6, wherein the selected curvature of each of the substantially identical sections varies along the symmetry axis to give the section a barrel shaped longitudinal cross-section.

8. The thermally compensated lens mount of claim 6, wherein the selected curvature of each of the substantially identical sections is constant.

9. The thermally compensated lens mount of claim 1, wherein the multilayer housing comprises at least three substantially identical sections equally spaced around the symmetry axis of the housing and each making an equal angle with the symmetry axis.

10. The thermally compensated lens mount of claim 1, wherein the CTE of the first material is selected to be smaller than the CTE of the second material.

11. The thermally compensated lens mount of claim 1, wherein the CTE of the first material is selected to be smaller than the CTE of the second material.

12. The thermally compensated lens mount of claim 1, further comprising a lens coupled to one end of the axially symmetric housing.

13. The thermally compensated lens mount of claim 12, wherein the curvature of the multilayer housing and the length of the multilayer housing along its symmetry axis are selected to compensate for the temperature dependence of the focal length of the lens.

14. The thermally compensated lens mount of claim 13, wherein the lens is designed to focus light in the infrared region of the electromagnetic spectrum.

15. A thermally compensated optical system comprising:
   a lens made of selected optical materials; and
   a lens mount comprising an axially symmetric multilayer housing formed by a layer of a first material having a first CTE that is bonded to a layer of a second material having a second CTE, the multilayer housing having a symmetry axis and a selected curvature along the symmetry axis such that differential thermal expansion of the first and second materials alters the length of the multilayer housing along the symmetry axis by changing the curvature of the multilayer housing.

16. A thermally compensating lens mount comprising a housing having a composition that varies between inner and outer surfaces of the housing to provide first and second coefficients of thermal expansion (CTE) at the inner and outer surfaces, respectively, the housing also having a symmetry axis and a selected curvature along the symmetry axis such that differential thermal expansion of the housing alters the length of the housing along its symmetry axis by changing the curvature of the housing.

17. The thermally compensating lens mount of claim 16, wherein the inner and outer surfaces characterized by first and second CTEs are surfaces of first and second materials having first and second coefficients of thermal expansion, respectively.

18. The thermally compensating lens mount of claim 16, wherein the inner and outer surfaces characterized by first and second CTEs are inner and outer surfaces of a material forming the housing and having a composition gradient between the inner and outer surfaces so that the composition of the material at the inner and outer surfaces have first and second coefficients of thermal expansion, respectively,

* * * * *